US009090490B2

(12) United States Patent
Lydic et al.

(10) Patent No.: US 9,090,490 B2
(45) Date of Patent: Jul. 28, 2015

(54) SYSTEM AND METHOD FOR WASTEWATER DISINFECTION

(75) Inventors: Trent Lydic, Cleveland, OH (US); Thomas Wilkinson, Jr., Cleveland, OH (US); Ronald Swinko, Cleveland, OH (US)

(73) Assignee: JET, INC., Cleveland, OH (US)

( * ) Notice: Subject to any disclaimer, the term of this patent is extended or adjusted under 35 U.S.C. 154(b) by 797 days.

(21) Appl. No.: 13/428,723

(22) Filed: Mar. 23, 2012

(65) Prior Publication Data

US 2013/0248460 A1     Sep. 26, 2013

(51) Int. Cl.
 C02F 1/32     (2006.01)
(52) U.S. Cl.
 CPC ......... C02F 1/325 (2013.01); *C02F 2201/3223* (2013.01); *Y10T 29/49428* (2015.01)
(58) Field of Classification Search
 CPC ............ C02F 1/32; C02F 1/325; B23P 17/04; Y10T 29/49428
 USPC .......... 210/748.01, 748.11, 143, 253; 422/20, 422/22, 24, 186, 186.3; 250/435, 432 R; 29/890.14
 See application file for complete search history.

(56) References Cited

U.S. PATENT DOCUMENTS 7,947,228 B2    5/2011  Girodet et al.
8,618,522 B2 *  12/2013 McKinney ................ 250/504 R

FOREIGN PATENT DOCUMENTS

WO    WO 2012/059746 A2 *  5/2012  ................ 204/158.2

* cited by examiner

*Primary Examiner* — Walter D Griffin
*Assistant Examiner* — Cameron J Allen
(74) *Attorney, Agent, or Firm* — The Marbury Law Group, PLLC

(57) ABSTRACT

A system and method for wastewater treatment using ultraviolet (UV) irradiation of wastewater flowing in a treatment chamber. Wastewater to be treated flows into the first UV exposure chamber where it is exposed to UV illumination. Wastewater exposure time is lengthened by channeling the wastewater to first flow down a first UV exposure chamber and then back up through a second UV exposure chamber both of which are in a single structure. The first and second UV exposure chambers are separated by the UV illumination source so that wastewater on the two sides of the UV illumination source (i.e. both UV exposure chambers) cannot mix, and so that UV illumination time is dictated by the flow rate of the wastewater and the length of the UV illumination source. Thus the UV illumination path is roughly twice the length of the UV illumination source.

25 Claims, 5 Drawing Sheets

SYSTEM AND METHOD FOR WASTEWATER DISINFECTION

BACKGROUND

For years, chlorine has been used extensively as a disinfectant in water and wastewater treatment processes. While chlorine is an effective disinfectant, the treated water is not potable, and must be dechlorinated using a precise dechlorination process. This additional step of dechlorination is not efficient and results in its own effluent that must be mitigated.

SUMMARY

Exposing wastewater to concentrate ultraviolet radiation under controlled conditions can accomplish the same disinfecting effect as can be obtained using chlorine disinfection without the additional step of dechlorination. Ultraviolet radiation offers several advantages over traditional chlorine treatment of wastewater. UV is effective against all microorganisms. It is economical, purifying hundreds of gallons per kilowatt hour. UV is safe, not requiring dangerous chemicals with the corresponding risk of overdose or danger to the environment. UV provides continuous germicidal action without special attention or measurement, and without leaving a chlorine taste in recycling systems and without corrosion problems affecting the plumbing. It is known that irradiation of water with ultraviolet light within the range from about 150 nanometers through about 300 nanometers is effective in destroying microorganisms.

The effectiveness of UV disinfection is a product of UV radiation intensity, wavelength and exposure time. In various embodiments illustrated herein, a first and second UV exposure chamber are provided. The first and second UV exposure chambers are separated by a UV illumination source. The UV illumination source could be UV fluorescent tubes, UV LEDs, UV xenon lamps, UV mercury-xenon lamps, UV argon lamps, UV deuterium lamps or any other suitable source of UVC radiation. This list is merely for purposes of example and is not intended as a limitation as to the potential sources of UV illumination.

Wastewater to be treated flows into the first UV exposure chamber where it is exposed to UV illumination. Wastewater exposure time is lengthened by channeling the wastewater to first flow down a first UV exposure chamber and then back up through a second UV exposure chamber. The first and second UV exposure chambers are separated by the UV illumination source so that wastewater on the two sides of the UV illumination source (i.e. both UV exposure chambers) cannot mix, and so that UV illumination time is dictated by the flow rate of the wastewater and the length of the UV illumination source. Thus the UV illumination path is roughly twice the length of the UV illumination source.

A mechanism for cleaning and/or replacing the UV illumination source is also provided. To this end, a system in which the UV illumination source and related assembly can be removed without the need to disassemble any major portion of the system is also provided. This allows a system operator to deal with a potential problem with UV sanitation units, that is, the collection of contaminants on the surface of the UV illumination source, which reduces the output of the UV illumination source.

Embodiments illustrated herein may also enclose the UV illumination source within a quartz tube, thereby preventing contaminants from building up on the UV illumination source itself. Quartz is transparent to UV radiation at the wavelengths used in disinfection of wastewater, having a high transmittance and allowing the passage of UV radiation with little loss in power. The quartz tube also protects the UV illumination source from direct contact with the wastewater being disinfected. A small air chamber between the UV illumination source and the quartz tube helps to regulate the temperature of the UV illumination source. While quartz is illustrated herein, other types of material may be used so long as they transmit a substantial portion of the UV energy from the UV illumination source.

Yet other embodiments illustrated herein allow the entire UV subassembly to be easily removed for cleaning without the need to open the UV exposure chambers or empty the wastewater treatment system. The UV subassembly is held in place during normal operation by a top plate. Once the top plate is removed, the entire UV subassembly easily slides out of the UV exposure chambers for cleaning.

DETAILED DESCRIPTION

Figure 1:
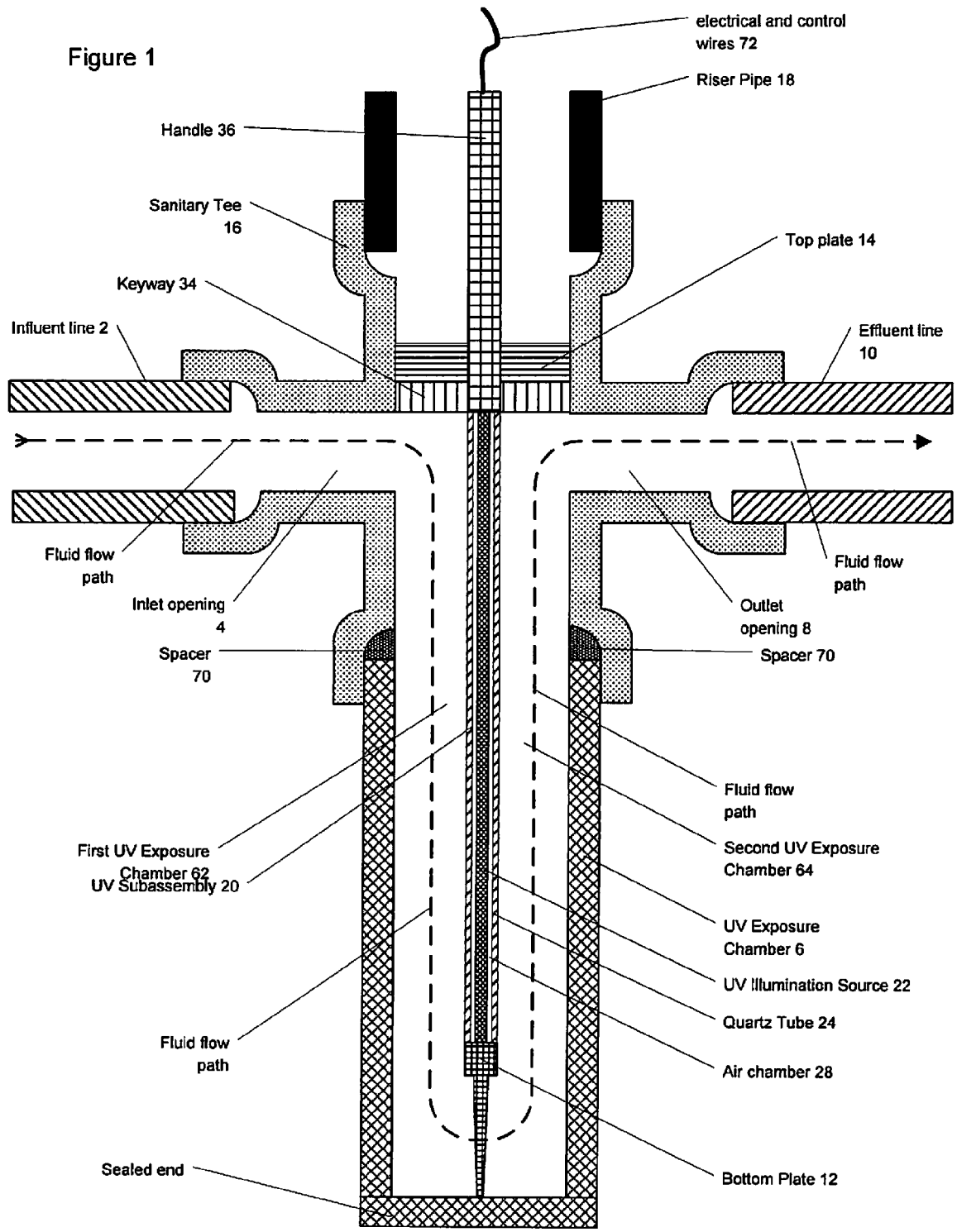
FIG. 1 illustrates a front cross section elevation view of an embodiment of the present invention.

Referring to FIG. 1, the UV disinfecting apparatus is illustrated. An embodiment of the apparatus is shown in cross section. The influent wastewater to be treated may be derived from a variety of sources and may be, for example, wastewater treatment plant effluent or filter effluent.

The apparatus comprises an influent line 2 connected to an inlet opening 4 on a double sanitary tee 16, and an effluent line 10 connected to an outlet opening 8 on the double sanitary tee 16. The top end of a vertically descending tube 6 is connected to the lower opening on the double sanitary tee 16. The lower end of the vertically descending tube 6 is sealed.

The upper opening of the double sanitary tee 16 is connected to a riser pipe 18. A UV subassembly 20 (described below) is removably fixed within the vertically descending tube 6 and divides the vertically descending tube 6 into a first UV exposure chamber 62 and a second UV exposure chamber 64. The UV subassembly 20 rests on a bottom plate 12 which centers the UV subassembly 20 within the vertically descending tube 6 and offsets the UV subassembly 20 from the bottom of the vertically descending tube 6. The UV subassembly 20 is secured within the vertically descending tube 6 by a top plate 14. The top plate 14 removably holds the UV subassembly 20 in position and covers the top end of the vertically descending tube 6. A handle 36 is attached to the upper surface of the top plate 14 and is used for inserting and removing the UV subassembly 20. In an embodiment, the handle 36 is hollow so as to permit electrical and control wires 72 for a UV illumination source 22 to pass through the handle 36, up the riser pipe 18 and out of the system, where it is connected to a suitable power supply. The UV illumination source 22 could be UV fluorescent tubes, UV LEDs, UV xenon lamps, UV mercury-xenon lamps, UV argon lamps, UV deuterium lamps or any other suitable source of UVC radiation.

In an embodiment, the vertically descending tube 6, the influent line 2 and effluent line 10 are formed with standard 4-inch ABS pipe and fittings. In an embodiment, the outer structure of the UV disinfecting device is made primarily of preformed ABS plastic pipe, although this is not intended as a limitation. Other suitable materials with sufficient structural rigidity and interconnectability would be acceptable. The influent line 2 and the effluent line 10 are connected to the vertically descending tube 6 by use of a double sanitary tee 16. The connections between the double sanitary tee 16 and the influent line 2 and the effluent line 10 are made by inserting the influent line 2 and effluent line 10 into corresponding flanges on the sanitary tee 16. Likewise, the vertically descending tube 6 is connected to the sanitary tee 16 by inserting the top end of the vertically descending tube 6 into a corresponding flange on the bottom of the sanitary tee 16.

Figure 2:
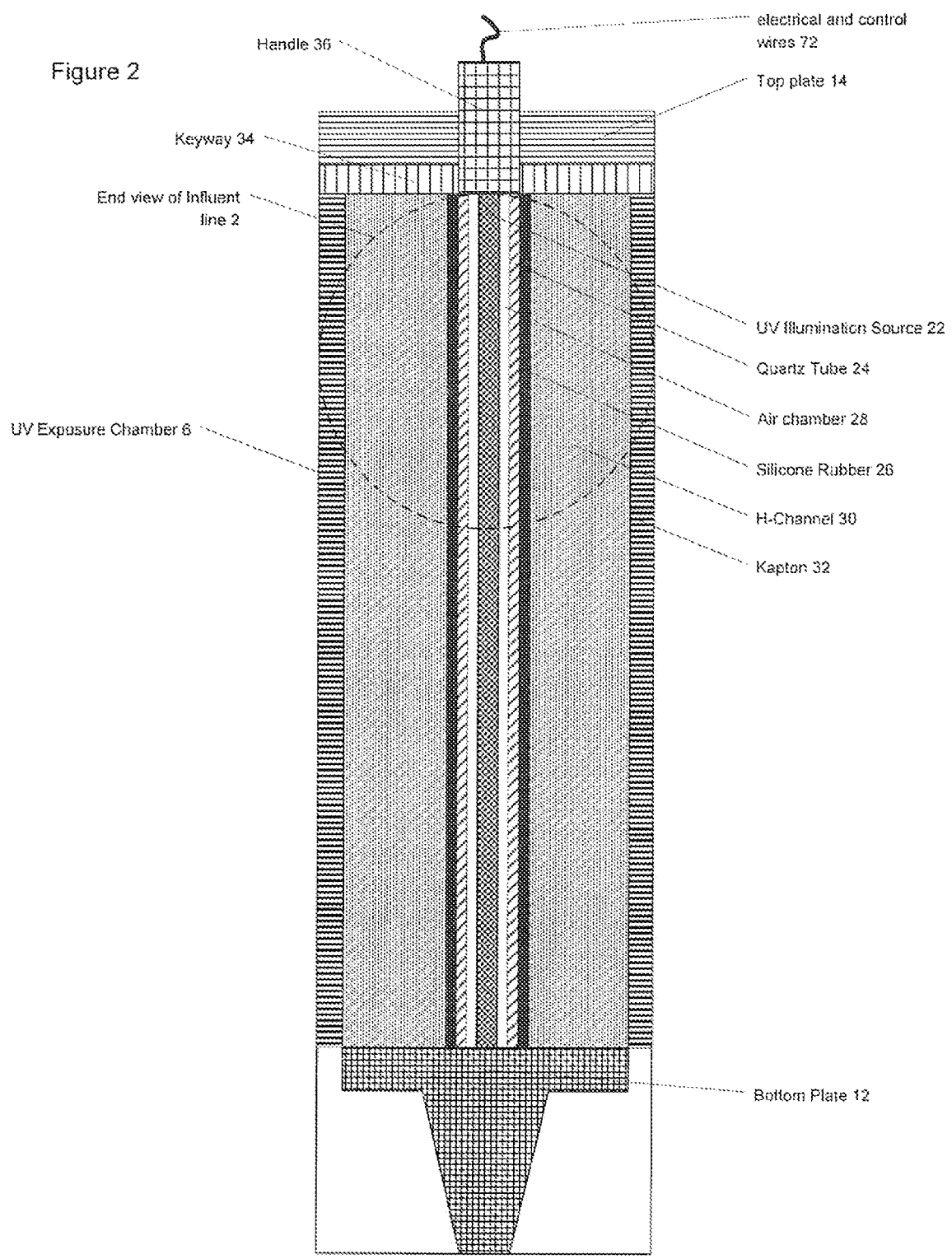
FIG. 2 illustrates a side cross section elevation view of an embodiment of the present invention.
Figure 3:
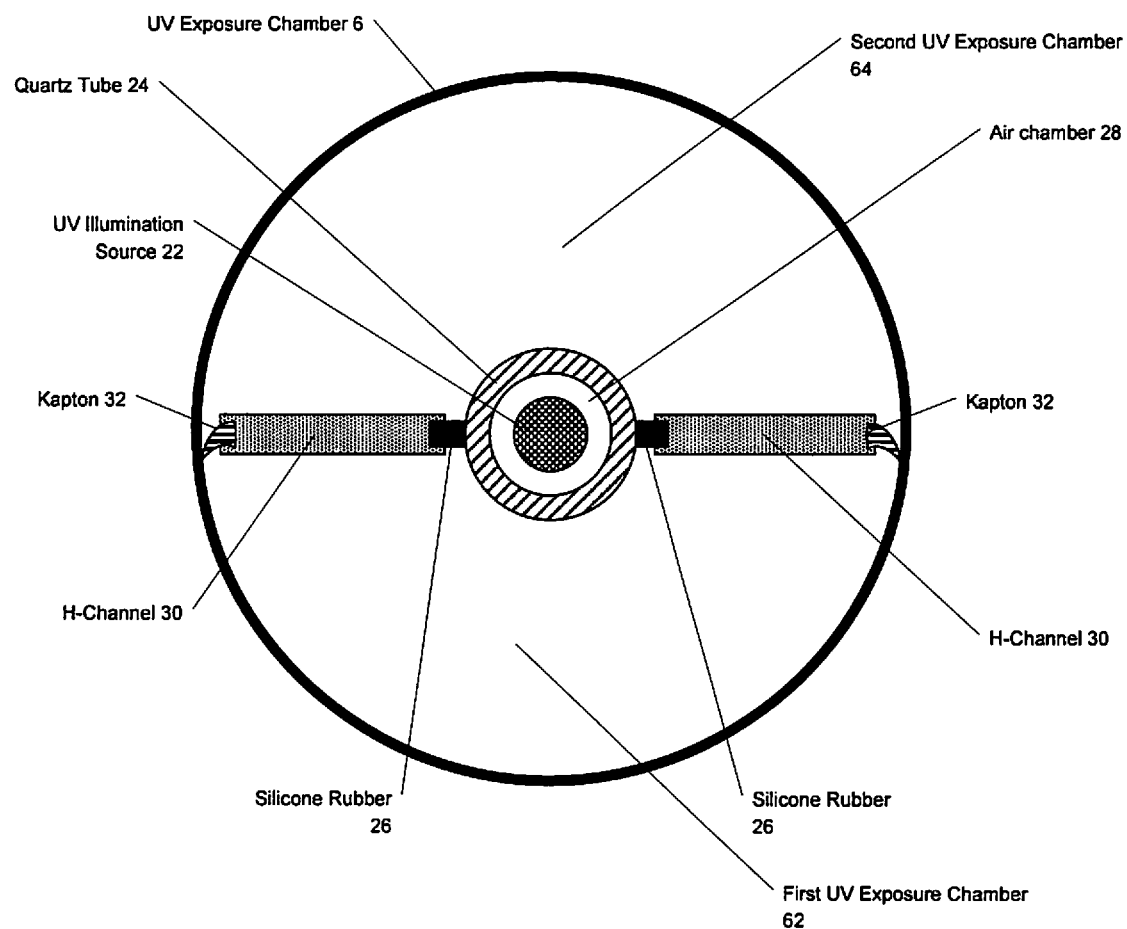
FIG. 3 illustrates a top view cross section of an embodiment of the present invention.

Referring to FIGS. 2 and 3, an embodiment of the UV subassembly 20 is illustrated in side view and top view. The UV subassembly 20 comprises a UV illumination source 22 positioned inside a surrounding quartz tube 24. The quartz tube 24 protects the UV illumination source 22 from damage and provides an air chamber 28 surrounding the UV illumination source 22. The air chamber 28 helps to regulate the temperature of the UV illumination source 22. A silicon rubber gasket 26 extends laterally away from both sides of the quartz tube 24. In an embodiment, a silicon rubber seal is preferred because it will create a seal yet not damage the quartz tube. The use of silicon rubber is not meant as a limitation. Other suitable materials that will provide a seal yet not damage the quartz tube are suitable for this function. The proximate edge of the silicon rubber gasket 26 presses snugly against the quartz tube 24 forming a liquid-tight seal. The amount of pressure between the seal and the quartz tube is the amount necessary to create a seal that will prevent wastewater from the first and second UV exposure chambers from mixing. The distal end of the silicon rubber gasket 26 is connected to one side of aluminum H-channel 30. The H-channel 30 provides structural integrity to the UV subassembly 20. Aluminum is preferred because it is light weight yet structurally rigid, but this is not meant as a limitation, as any suitable material that provides the structural integrity of the UV subassembly 20 may be used for the H-channel 30.

The opposite side of the H-channel 30 is connected to a strip of flexible polyimide film 32 such as Kapton® brand film. The flexible polyimide film 32 presses snugly against the inner surface of the vertically descending tube 6 to create a substantially fluid-tight seal. Again, the amount of pressure between the flexible polyimide film 32 and the inside wall of vertically descending tube 6 is the amount necessary to create a seal that will prevent wastewater from the first and second UV exposure chambers from mixing. The flexible polyimide film 32 creates a defined flow path within the vertically descending tube 6. The combination of the quartz tube 24, the silicon rubber gasket 26, the H-channel 30 and the flexible polyimide film 32 serve to divide the vertically descending tube 6 into two sections, namely the first UV exposure chamber 62 and the second UV exposure chamber 64. Wastewater enters the first UV exposure chamber 62 at the top, travels down the length of the UV subassembly 20, flows around the bottom plate 12 and flows up the second UV exposure chamber 64. Thus the waste water is exposed to UV radiation on both sides of the UV illumination source 22, first while flowing down the first UV exposure chamber 62 and again while flowing up the second UV exposure chamber 64. In this way, the exposure time of the waste water to UV radiation is doubled without the need to increase the length of the UV illumination source or the need to use additional UV illumination sources.

The bottom plate 12 has a vertical standoff at its base to create a space that allows influent to flow between the first UV exposure chamber 62 and the second UV exposure chamber 64. The bottom plate 12 supports the UV subassembly 20. A vertical standoff of the bottom plate 12 ensures adequate flow of influent between the first UV exposure chamber 62 and the second UV exposure chamber 64. The influent flows through the influent line 2 and enters the first UV exposure chamber 62 through the inlet opening 4. Inside the first UV exposure chamber 62 the influent is exposed to UV radiation produced by the UV illumination source 22 as the influent flows down the first UV exposure chamber 62, around the bottom plate 12, and into the second UV exposure chamber 64. While in the second UV exposure chamber 64 the influent is exposed to UV radiation produced by the UV illumination source 22. The influent flows up the second UV exposure chamber 64 through the outlet opening 8 and out the effluent line 10.

Figure 4A:
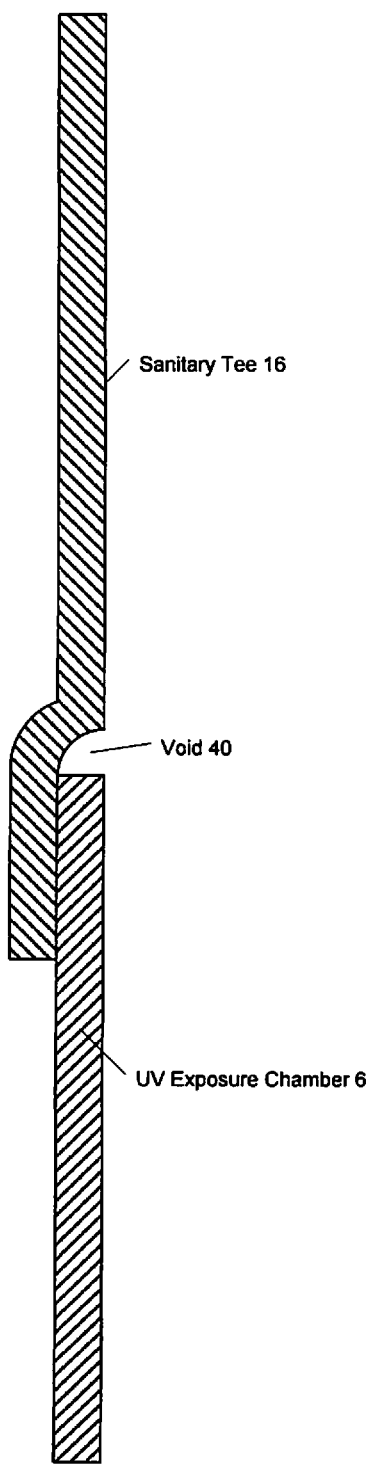
FIGS. 4a and 4b illustrate a side cross section elevation view of a joint between components in an embodiment of the present invention.
Figure 4B:
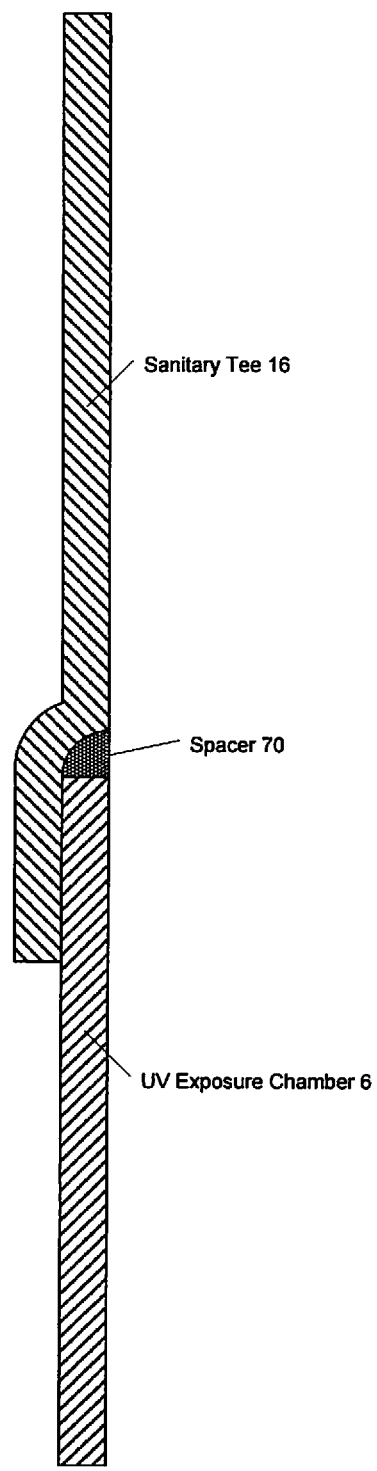

Referring to FIGS. 4a and 4b, a cross section of one side of the joint between the sanitary tee 16 and the vertically descending tube 6 is shown. The interior of the resulting joint includes a small triangular void 40 around the entire interior circumference of the joint. The presence of the void 40 can prevent the flexible polyimide film 32 from forming a fluid-tight seal against the inside of the vertically descending tube 6 where the vertically descending tube 6 meets the sanitary tee 16. Having a uniform snug seal will prevent wastewater from the first UV exposure chamber 62 mixing with wastewater from the second UV exposure chamber 64. This void 40 is eliminated by use of a spacer 70 which fits tightly into the void 40 and creates a smooth inner surface around the entire inner circumference of the joint. In an embodiment, the spacer 70 is made of ABS plastic, although this is not intended as a limitation. Other suitable materials with sufficient structural rigidity and interconnectability would be acceptable.

Figure 5:
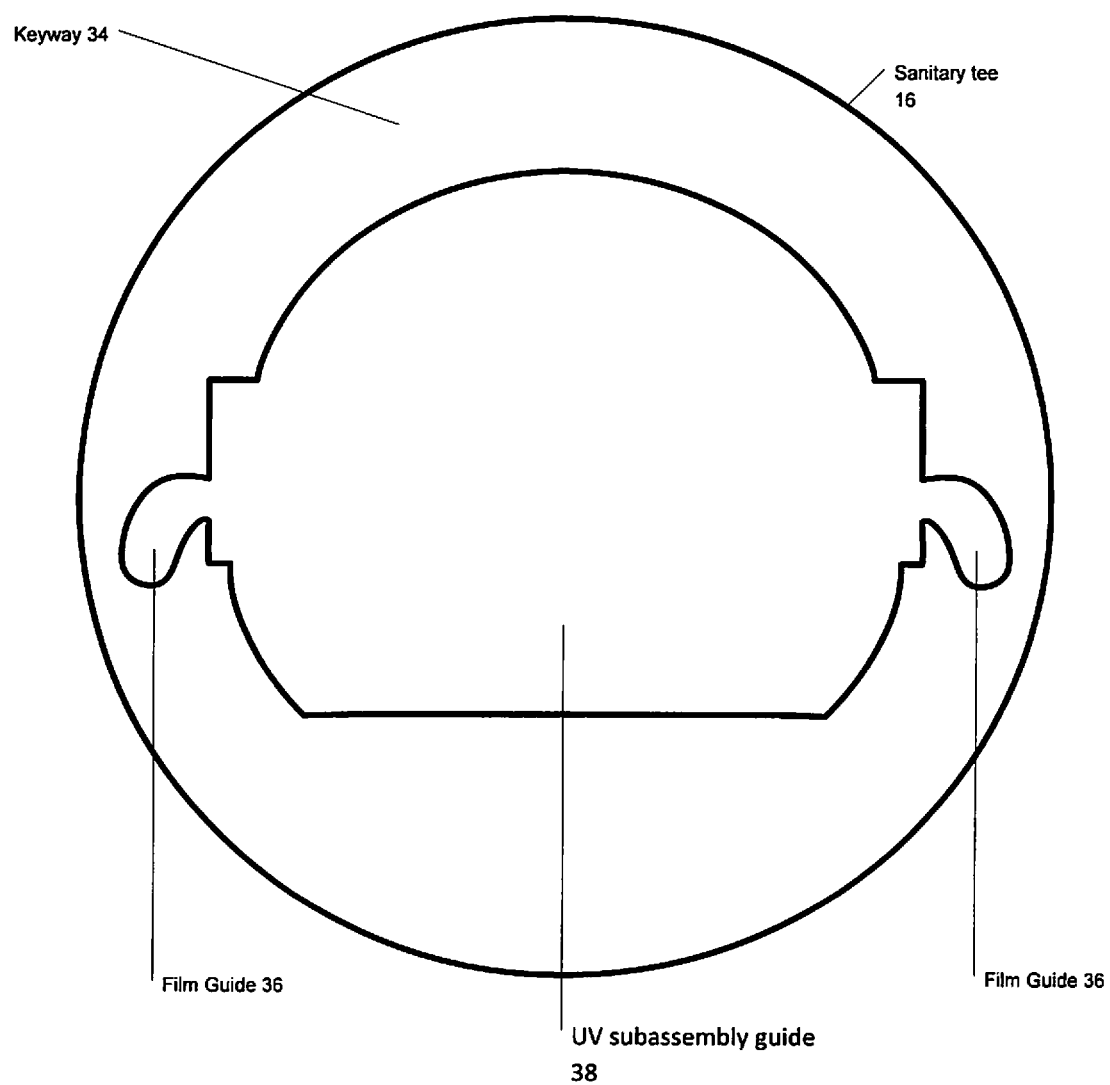
FIG. 5 illustrates a top view of a keyway in an embodiment of the present invention.

Referring to FIG. 5, an embodiment of a keyway is illustrated in top view. A keyway 34 is installed in the sanitary tee 16 above the inlet opening 4 and outlet opening 8. The keyway 34 incorporates a UV subassembly guide 38 to ensure proper positioning of the UV subassembly 20 as it is inserted into the sanitary tee 16. The keyway 34 incorporates film guides 36 to ensure the flexible polyimide film 32 is positioned correctly and imparts a curl to the flexible polyimide film 32 which causes the flexible polyimide film 32 to spring into a position snugly against the inner surface of the vertically descending tube 6, thereby creating a fluid-tight seal and dividing the vertically descending tube 6 into the first UV exposure chamber 62 and the second UV exposure chamber 64.

A system and method for providing wastewater disinfection have been described. It will be understood by those skilled in the art that the present invention may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the," is not to be construed as limiting the element to the singular.

What is claimed is:

1. An apparatus for treatment of wastewater, the apparatus comprising:

a vertically descending tube having a sealed bottom;

a UV assembly inserted into the vertically descending tube, the UV assembly comprising;
a source of UV illumination;
a film divider for dividing the vertically descending tube into first and second UV exposure chambers;
a support for the UV assembly, whereby the UV assembly support creates a channel for wastewater flow whereby wastewater entering the first UV exposure chamber, flowing through the length of the first UV exposure chamber, flowing through the channel created by the UV assembly support, into the second UV exposure chamber, flowing through the length of the second UV exposure chamber; and whereby the wastewater is exposed to UV illumination from the UV illumination source in the first and second UV exposure chambers.

2. The apparatus of claim 1, further comprising a protective tube, said UV illumination source being placed in the protective tube, the protective tube being adapted for protecting said UV illumination source from contamination by wastewater.

3. The apparatus of claim 2, wherein said protective tube is made from quartz crystal.

4. The apparatus of claim 1, wherein the UV illumination source is selected from the group consisting of UV fluorescent tubes, UV LEDs, UV xenon lamps, UV mercury-xenon lamps, UV argon lamps and UV deuterium lamps.

5. The apparatus of claim 1, wherein said apparatus further comprises:
an inlet tube adapted for connection to a septic tank or other wastewater treatment system; and
an outlet tube adapted for connection to a drainfield or other wastewater treatment system.

6. The apparatus of claim 1, wherein said UV illumination source emits radiation having a wavelength between about 150 to 300 nanometers.

7. The apparatus of claim 1, wherein the UV assembly is separated from the bottom of the vertically descending tube by a bottom plate, said bottom plate providing a vertical standoff from the bottom of the sealed end of the vertically descending tube, thereby ensuring adequate flow of water under the UV assembly.

8. The apparatus of claim 1, wherein a contoured spacer is inserted into a joint between a sanitary tee and the vertically descending tube to provide a smooth inner surface of the joint, thereby permitting a substantially watertight seal to be created across the joint.

9. The apparatus of claim 1, wherein the vertically descending tube is divided vertically by the UV assembly.

10. The apparatus of claim 9, wherein the UV assembly includes dividers on opposite sides of the UV assembly extending outwardly away from the center of the UV assembly.

11. The apparatus of claim 10, wherein the dividers comprise one or more flexible materials such that they form a substantially watertight seal against the inner surface of the vertically descending tube.

12. The apparatus of claim 11, wherein the flexible material is flexible polyimide film.

13. The apparatus of claim 11, wherein the flexible material is held in place against the inner surface of the vertically descending tube by a keyway, said keyway located near the top of the UV assembly.

14. The apparatus of claim 13, wherein the keyway imparts a curl to the flexible material such that the flexible material maintains its shape and position against the flow of wastewater in the vertically descending tube, thereby preventing wastewater from passing between the flexible material and the inner surface of the vertically descending tube.

15. A method for providing an ultra violet wastewater purification apparatus comprising:
positioning an ultraviolet illumination assembly, having a length, in a vertically descending tube, the vertically descending tube having a sealed bottom and walls, the UV illumination assembly comprising a UV illumination source, and a support for the UV illumination assembly whereby said bottom plate provides a vertical standoff from the bottom of the sealed end of the vertically descending tube, thereby ensuring adequate flow of water under the UV assembly;
mounting the UV illumination assembly in a system of piping with waterproof joints having an inlet joined to an outlet by a double sanitary tee, a vertically descending tube and a vertically ascending riser pipe;
disposing the system of piping in a suitable location with the inlet connected to a septic tank or other wastewater treatment system and the outlet connected to a drainfield or other wastewater treatment system;
placing the UV illumination source into a protective tube, the protective tube being adapted for protecting said UV illumination source from contamination by wastewater;
attaching dividers on opposite sides of the UV illumination assembly extending outwardly away from the center of the UV assembly, said dividers to vertically divide the vertically descending tube into two vertical UV illumination chambers;
attaching one or more flexible materials to the dividers such that they form a substantially watertight seal against the inner surface of the vertically descending tube;
attaching a keyway in the sanitary double tee to hold the outer edges of the flexible material against the inner surface of the vertically descending tube;
lowering the insert through the vertically ascending riser pipe and the keyway into the vertically descending tube;
enclosing the insert within the vertically descending tube; and
connecting the UV illumination source to a source of electrical power.

16. The method of claim 15, wherein the protective tube is made from quartz crystal.

17. The method of claim 15, wherein the UV illumination source is selected from the group consisting of UV fluorescent tubes, UV LEDs, UV xenon lamps, UV mercury-xenon lamps, UV argon lamps and UV deuterium lamps.

18. The method of claim 15, wherein said UV illumination source emits radiation having a wavelength between about 150 to 300 nanometers.

19. The method of claim 15, further comprising inserting a contoured spacer into a joint between the sanitary double tee and the vertically descending tube, thereby providing a smooth inner surface of the joint, thereby permitting a substantially watertight seal to be created across the joint.

20. The method of claim 15, wherein the flexible material comprises flexible polyimide film.

21. The method of claim 15, wherein the keyway imparts a curl to the flexible material such that the flexible material maintains its shape and position against the flow of wastewater in the vertically descending tube, thereby preventing wastewater from passing between the flexible material and the inner surface of the vertically descending tube.

22. The method of claim 15, wherein the step of disposing the system of piping further comprises placing the system of piping below ground level.

23. The method of claim 15, further comprising disinfecting wastewater by causing wastewater to flow into the inlet, through the double sanitary tee, down the first UV illumination chamber, through the channel created by the UV illumination assembly support, up the second UV illumination chamber, and out the outlet.

24. The method of claim 18, wherein the UV illumination source is connected to a power source which causes the UV illumination source to emit UV radiation.

25. The method of claim 18, wherein the wastewater is exposed to UV radiation as it flows through the first and second UV illumination chambers, such exposure sufficient to disinfect the wastewater.

* * * * *